United States Patent
Laack et al.

(10) Patent No.: US 10,416,465 B2
(45) Date of Patent: Sep. 17, 2019

(54) DISPLAY DEVICE EMPLOYING A VIRTUAL PLANE OVERLAYING MECHANICAL INDICIA

(71) Applicant: Visteon Global Technologies, Inc., Van Buren Township, MI (US)

(72) Inventors: Alexander van Laack, Aachen (DE); Ruddy Cittadini, Cologne (DE); Frederik Belzl, Cologne (DE)

(73) Assignee: Visteon Global Technologies, INC., Van Buren Township, MI (US)

( * ) Notice: Subject to any disclaimer, the term of this patent is extended or adjusted under 35 U.S.C. 154(b) by 0 days.

(21) Appl. No.: 15/886,101

(22) Filed: Feb. 1, 2018

(65) Prior Publication Data

US 2018/0217388 A1    Aug. 2, 2018

(30) Foreign Application Priority Data

Feb. 1, 2017 (DE) .................. 10 2017 101 980

(51) Int. Cl.

| | |
|---|---|
| *G02B 27/01* | (2006.01) |
| *B60K 35/00* | (2006.01) |
| *G02B 27/14* | (2006.01) |
| *G02F 1/01* | (2006.01) |
| *G09F 19/16* | (2006.01) |
| *B60K 37/02* | (2006.01) |
| *G02F 1/1335* | (2006.01) |

(52) U.S. Cl.
CPC .............. *G02B 27/14* (2013.01); *B60K 35/00* (2013.01); *B60K 37/02* (2013.01); *G02B 27/0101* (2013.01); *G02B 27/0149* (2013.01); *G02F 1/01* (2013.01); *G09F 19/16* (2013.01); *B60K 2370/154* (2019.05); *B60K 2370/155* (2019.05); *B60K 2370/27* (2019.05); *B60K 2370/28* (2019.05); *B60K 2370/31* (2019.05); *B60K 2370/33* (2019.05); *B60K 2370/347* (2019.05); *B60K 2370/693* (2019.05); *G02F 2001/133557* (2013.01)

(58) Field of Classification Search
CPC ........ G02B 27/0149; G02B 2027/0161; G02B 2027/0118; G02B 2027/0163; G02B 2027/0165; B60K 35/00; B60K 37/02
See application file for complete search history.

(56) References Cited

FOREIGN PATENT DOCUMENTS

| FR | 2957860 A1 * | 9/2011 | ............ B60K 37/06 |
|---|---|---|---|
| JP | 2004233701 A * | 8/2004 | ............ B60K 35/00 |

* cited by examiner

*Primary Examiner* — Ryan D Howard
(74) *Attorney, Agent, or Firm* — Quinn IP Law

(57) ABSTRACT

Display device is disclosed herein, and may be implementable in a variety of contexts, including a motor vehicle (for example, the instrument cluster). A semi-transparent plane is essentially placed in between a display and a mechanical element member. This allows a virtual projection of information over the mechanical plane in an on-state, while the mechanical element shows non-indicia during the off state.

20 Claims, 2 Drawing Sheets

DISPLAY DEVICE EMPLOYING A VIRTUAL PLANE OVERLAYING MECHANICAL INDICIA

CROSS-REFERENCE TO RELATED APPLICATION

This application claims priority to German Patent Application No. 10 2017 101 980.4 filed Feb. 1, 2017, and entitled "DISPLAY DEVICE FOR THE INTERIOR OF A MOTOR VEHICLE," which is herein incorporated by reference.

BACKGROUND

Motor vehicle drivers and passengers prefer high-quality mechanical elements, such as measurement instruments, which have the appearance of a high-quality Swiss watch. The disadvantage of such mechanical elements is that they are normally not reconfigurable. As such, many mechanical displays, such as tachometers and mechanical speed displays, are now being replaced with displays, that is to say, generally flat components used for visualization, which show context-related content.

The problem with displays is that they appear flat and artificial. If a reconfigurable group display is turned off, it looks like a black hole without any attractive aspect. Furthermore, it is not possible to install large displays due to the conventional arrangement of displays next to mechanical devices. Yet, it is not advantageous to combine several small displays instead of using just one large display.

Alternative devices which use a mechanical movement in order to turn mechanical measurement devices and thus bring displays to the front require moving parts, making these devices complex and prone to faults.

The prior art discloses configurations in which a mechanical or electromechanical indicator instrument is partially covered with a virtual image. As an example, WO2014/125546 A1 discloses a display device, comprising the following components: a display element with a display area, visible from the front side; a reflection element which is positioned in front of the display element and has semi-transparent properties; as well as an image output device which outputs an image in the direction of the reflection element to display a virtual image. A control unit is used to control the light emission of a light-emitting element such that a part of the display area which is covered by the virtual image when viewed from front to rear is darker than the part of the display area which is not covered by the virtual image when viewed from the same angle.

US 2008 309 470 A1 describes a built-in instrument cluster for a motor vehicle having at least one display device which emits image-forming light and is arranged in a direct field of view of an observer, and at least one illuminated and/or self-illuminating electromechanical indicator device which is arranged at an angle to the display device in the observer's field of view and which is moved into the observer's field of view together with the display device by an optical combiner adapted to reflect the image-forming light of the electromechanical indicator device. To save overall depth for motor vehicle components abutting the electromechanical indicator device, the electromechanical indicator device at least partly includes light guides and/or light projectors. The optical combiner may be formed by a semi-transparent mirror, the display device being arranged behind the mirror in a viewing direction of the observer and the electromechanical indicator device being arranged below the mirror.

DE 10 2005 011 094 A1 discloses a driver information system having a control unit with a plurality of functional elements and a display unit for the graphical representation of information at least relating to the control unit. The driver information system has a plurality of display modes for displaying the information displayed on the display unit. As such, the display unit has a semi-transparent mirror arranged at an angle, wherein a display is arranged behind the semi-transparent mirror in the driver's viewing direction, and physical circular instruments for the number of revolutions and speed are arranged in the driver's reflected viewing direction.

SUMMARY

The object of the disclosure is to provide a display device with a reconfigurable display which is visually appealing both when turned off and when turned on.

The object of the disclosure is achieved by a display device for the interior of a motor vehicle, having the features specified in claim 1. Any advantageous developments are specified in the sub-claims.

The solution according to the disclosure is a display device for the interior of a motor vehicle, comprising
- a mechanical decorative member with a side facing the observer and provided with mechanical elements,
- at least one semi-transparent mirror panel arranged in front of the mechanical decorative member and in the observer's viewing direction, and
- a display for generating images, arranged such that the semi-transparent mirror panel is located between the side of the display image output and the mechanical decorative member, and arranged at an angle a to the display such that a virtual display reflection is generated when the display is turned on by reflecting the display image on the semi-transparent mirror panel, the plane of which being positioned at an angle b to the display which is larger than the angle a and located above the side of the mechanical decorative member facing the observer in the observer's viewing direction, so that the mechanical decorative member is overlapped by the virtual display reflection, wherein the mechanical decorative member with the mechanical elements is still visible to the observer when the display is turned off.

According to the concept of the disclosure, a virtual image with one or more pieces of virtual information is projected onto a backdrop provided with mechanical elements, that is physically real elements. As such, a decorative member formed with mechanical elements is used as a backdrop, fulfilling a design or aesthetic purpose when the device is turned off. This means that the aesthetics of the mechanical decorative member are maintained as such even if the power is turned off. The concept according to the disclosure of overlapping mechanical, that is physical, elements with virtual information makes it possible to combine high-quality craftsmanship, in terms of the design for the decorative member, with a high level of display reconfigurability.

When the device is turned on, the virtual image is generated which is located above the mechanical decoration. The virtual image is generated by reflecting the display on a semi-transparent mirror panel and creating an appropriate overlap, wherein the preferably precise overlap of the decorative member with the virtual display reflection as a virtual image creates the impression as if the decorative member is moving or dynamically changing. In this way, it is possible to limit the number of mechanical movements required in the display device. Thus, for example, indicators can be animated on the display as if they had been placed onto the mechanical elements. However, the electronics relevant for the display device are not located in the decorative member, but rather in the display, which is reflected, as well as in the connected components. The structure of the display device according to the disclosure therefore makes it possible to reduce complexity compared with the prior art. At the same time, the number of displays required can be limited to one display. One main advantage is that the entire display surface can be used to display reconfigurable content.

Furthermore, the structure according to the disclosure allows high-quality mechanical decoration to be implemented, giving the observer a good perception of the equipment and featuring depth, precision and details which cannot be produced on displays. Overlapping the virtual image and mechanical decoration creates a holographic effect, whereby the decorative member appears dynamically for the observer.

The mechanical elements in the decorative member can be illuminated, however, the decorative member does not include any displays. If the mechanical elements of the decorative member are not illuminated from behind, it is possible to virtually project texture and lighting onto them via the display. This enables a high degree of reconfigurability.

The decorative member can include moving elements, however, the mechanical elements are preferably static. If the observer looks into the semi-transparent mirror panel, the display reflection lies above the mechanical elements of the mechanical decoration. This results in a good reconfigurability of the display. If the display is turned off, the observer looks directly at the mechanical decorative member through the semi-transparent mirror panel. In this way, the display device assembly still looks appealing when the power has been turned off and creates a first-class look.

According to an advantageous embodiment of the disclosure, the semi-transparent mirror panel is made from combiner glass. As is known, a combiner is made of a reflecting, transparent panel.

The display device may also have at least one means for setting a tint of the semi-transparent mirror panel. As such, the semi-transparent mirror panel may be electrically toned itself, for example, and/or may have an additional electrical tinting film. This tint may be suitable for fading out the background depending on the content.

The surface of the decorative member facing the observer and the side of the display showing the image are preferably positioned at a 90-degree angle to each other. The semi-transparent mirror panel is positioned in the middle, allowing the virtual reflection to be projected onto the mechanical decorative member. As such, the semi-transparent mirror panel is preferably arranged such that the plane of the virtual display reflection overlapping the mechanical decorative member and its mechanical elements is also positioned at an angle b=90 degrees to the display as an image source for the virtual reflection.

According to a further design of the disclosure, the display device only comprises one display, but several semi-transparent mirror panels to generate multiple virtual levels.

BRIEF DESCRIPTION OF DRAWINGS

Further details, features and advantages of the disclosure design will become apparent from the following description of exemplary embodiments with reference to the relevant drawings. In which.

DETAILED DESCRIPTION

Figure 1:
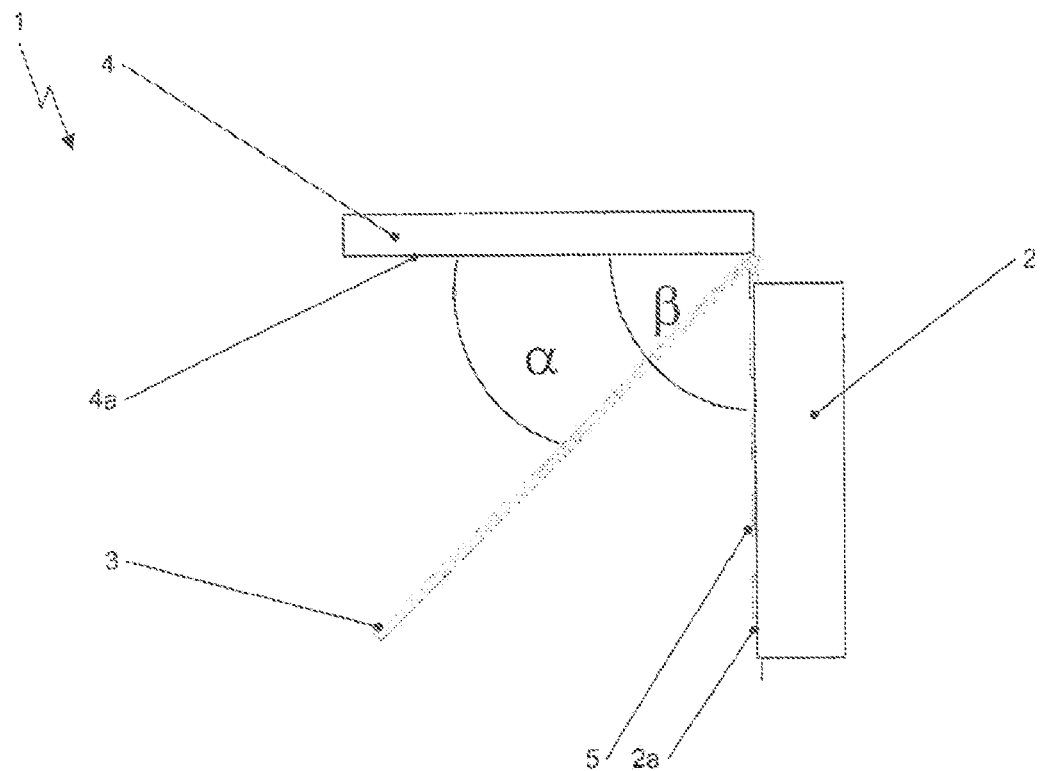
FIG. 1: shows a schematic diagram of an embodiment of an instrument display device according to the disclosure in a side view.
Figure 2:
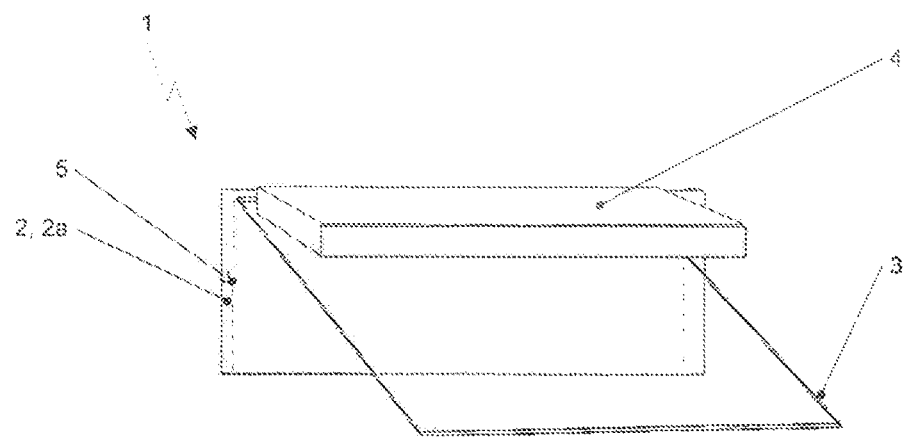
FIG. 2: shows a schematic diagram of an embodiment of the instrument display device according to the disclosure in a perspective front view.

The figures FIG. 1 and FIG. 2 show the schematic diagram of an exemplary embodiment of a display device 1 according to the disclosure for the interior of a motor vehicle. Display device 1 comprises a mechanical decorative member 2 with a side 2a facing an observer, for example the driver of a motor vehicle, and provided with mechanical elements, for example decorative elements and/or measurement devices. The mechanical elements are preferably static.

Display device 1 further comprises—in the viewing direction of the observer, for example the driver of a motor vehicle—a semi-transparent mirror panel 3 arranged in front of mechanical decorative member 2, which is made from combiner glass and may have means for setting a tint. As such, the semi-transparent mirror panel 3 may be electrically tinted itself, or it may have an additional electrical tinting film. The tint may be suitable for fading out the background depending on the content.

Furthermore, display 4 for generating images is arranged such that the semi-transparent mirror panel 3 is located between the side 4a of the image output of display 4 and the mechanical decorative member 2. As such, display 4 is positioned at an angle a to semi-transparent mirror panel 3 such that, if display 4 is turned on, a virtual display reflection 5 is generated by reflecting the display 4 on semi-transparent mirror panel 3, the plane of which being aligned at an angle b to display 4 which is larger than angle a. This virtual display reflection 5 is positioned within the observer's viewing direction above the observer-facing side 2a of mechanical decorative member 2 so that the mechanical decorative member 2 is overlapped by virtual display reflection 5.

The observer-facing side 2a of mechanical decorative member 2 and the imaging-outputting side 4a of display 4 are positioned at a 90-degree angle to one another, according to the exemplary embodiment shown. Semi-transparent mirror panel 3, made from combiner glass, is arranged in the middle and makes it possible to project virtual reflection 5 onto mechanical decorative member 2. As such, semi-transparent mirror panel 3 is arranged such that a display reflection 5 is generated as a virtual image by reflecting the display image on the reflecting combiner glass of semi-transparent mirror panel 4, this reflection being aligned at an angle b=90 degrees to the plane of display 4 and being located above decorative member 2. More specifically, if the observer looks into the combiner glass, the display image is reflected and display reflection 5 appears at a virtual plane which overlaps the mechanical elements of decorative member 2. In this way, moving indicators animated on display 4, for example, can be reflected as if they were placed on the mechanical elements of decorative member 2.

What is claimed is:

1. A display device viewable by an observer, comprising:
   a mechanical decorative member having a side facing the observer, the mechanical decorative member including mechanical elements disposed on the observer facing side of the of the mechanical decorative member;
   a tintable mirror panel arranged relative to the observer facing side of the mechanical decorative member, wherein the tintable mirror panel is semi-transparent such that the mechanical elements on the observer facing side of the mechanical decorative member are viewable through the semi-transparent tintable mirror panel; and a display including a display image output disposed on a first side of the display adjustable between an off state and an on state, the display being configured to generate images when the display is in the on state, wherein a virtual display reflection is generated by reflecting the display image output using the semi-transparent tintable mirror panel when the display is in the on state, wherein the virtual display reflection is projected on the mechanical elements of the mechanical decorative member such that the virtual display reflection overlaps on the mechanical elements to create a holographic effect, whereby the holographic effect causes the mechanical decorative member to appear to dynamically change to the observer.

2. The display device according to claim 1, wherein the mechanical elements of the mechanical decorative member are configured to illuminate.

3. The display device according to claim 1, wherein the mechanical elements are static in position on the mechanical decorative member.

4. The display device according to claim 1, wherein the semi-transparent tintable mirror panel is formed of combiner glass.

5. The display device according to claim 1, wherein the semi-transparent tintable mirror panel is disposed at an angle a of orientation relative to the display, the mechanical decorative member is disposed at an angle b of orientation relative to the display and the angle b of the orientation of the mechanical decorative member relative to the display is larger than the angle a of orientation of the semi-transparent tintable mirror panel relative to the display.

6. The display device according to claim 5, wherein the mechanical decorative member is disposed at the angle b of orientation of 90 degrees relative to the display.

7. The display device according to claim 1, wherein the semi-transparent tintable mirror panel is arranged such that a plane of the virtual display reflection overlapping the mechanical elements of the mechanical decorative member is aligned at an angle of 90 degrees to the display.

8. The display device according to claim 1 further comprising at least one means for setting a tint of the semi-transparent tintable mirror panel.

9. The display device according to claim 8, wherein the means for setting the tint of the semi-transparent tintable mirror panel further comprising means configured to electrically tint the semi-transparent tintable mirror panel.

10. The display device according to claim 8, wherein the means for setting the tint of the semi-transparent tintable mirror panel further comprising means configured as an electrical tinting film.

11. A display device viewable by an observer, comprising:
a mechanical decorative member having a side facing the observer, the mechanical decorative member including mechanical elements disposed on the observer facing side of the of the mechanical decorative member, wherein the mechanical elements are static in position on the mechanical decorative member;
a tintable mirror panel arranged relative to the observer facing side of the mechanical decorative member, wherein the tintable mirror panel is semi-transparent and formed of combiner glass such that the mechanical elements on the observer facing side of the mechanical decorative member are viewable through the semi-transparent tintable mirror panel; and a display including a display image output disposed on a first side of the display adjustable between an off state and an on state, the display being configured to generate images when the display is in the on state, wherein a virtual display reflection is generated by reflecting the display image output using the semi-transparent tintable mirror panel when the display is in the on state, wherein the virtual display reflection is projected on the mechanical elements of the mechanical decorative member such that the virtual display reflection overlaps on the mechanical elements to create a holographic effect, whereby the holographic effect causes the mechanical decorative member to appear to dynamically change to the observer.

12. The display device according to claim 11, wherein the mechanical elements of the mechanical decorative member are configured to illuminate.

13. The display device according to claim 11, wherein the semi-transparent tintable mirror panel is disposed at an angle a of orientation relative to the display, the mechanical decorative member is disposed at an angle b of orientation relative to the display and the angle b of the orientation of the mechanical decorative member relative to the display is larger than the angle a of orientation of the semi-transparent tintable mirror panel relative to the display.

14. The display device according to claim 13, wherein the mechanical decorative member is disposed at the angle b of orientation of 90 degrees relative to the display.

15. The display device according to claim 13, wherein the semi-transparent tintable mirror panel is arranged such that a plane of the virtual display reflection overlapping the mechanical elements of the mechanical decorative member is aligned at an angle of 90 degrees to the display.

16. The display device according to claim 11 further comprising at least one means for setting a tint of the semi-transparent tintable mirror panel.

17. The display device according to claim 16, wherein the means for setting the tint of the semi-transparent tintable mirror panel further comprising means configured to electrically tint the semi-transparent tintable mirror panel.

18. The display device according to claim 16, wherein the means for setting the tint of the semi-transparent tintable mirror panel further comprising means configured as an electrical tinting film.

19. A display device viewable by an observer, comprising:
a mechanical decorative member having a side facing the observer, the mechanical decorative member including mechanical elements disposed on the observer facing side of the of the mechanical decorative member, wherein the mechanical elements are static in position on the mechanical decorative member;
a tintable mirror panel arranged relative to the observer facing side of the mechanical decorative member, wherein the tintable mirror panel is semi-transparent and formed of combiner glass such that the mechanical elements on the observer facing side of the mechanical decorative member are viewable through the semi-transparent tintable mirror panel;
at least one means for setting a tint of the semi-transparent tintable mirror panel; and
a display including a display image output disposed on a first side of the display adjustable between an off state and an on state, the display being configured to generate images when the display is in the on state, wherein a virtual display reflection is generated by reflecting the display image output using the semi-transparent tintable mirror panel when the display is in the on state, wherein the virtual display reflection is projected on the mechanical elements of the mechanical decorative member such that the virtual display reflection overlaps on the mechanical elements to create a holographic effect, whereby the holographic effect causes the mechanical decorative member to appear to dynamically change to the observer.

20. The display device according to claim 19, wherein the means for setting the tint of the semi-transparent tintable mirror panel further comprises at least one of a means configured to electrically tint the semi-transparent tintable mirror panel and a means configured as an electrical tinting film.

* * * * *